(12) United States Patent
Morley et al.

(10) Patent No.: US 7,469,218 B2
(45) Date of Patent: Dec. 23, 2008

(54) METHOD FOR FACILITATING ORDERING OF GARMENTS

(76) Inventors: Ross G. Morley, 9 The Kingsway, Toronto, Ontario (CA) M8X 2S9; Deborah A. Morley, 9 The Kingsway, Toronto, Ontario (CA) M8X 2S9

( * ) Notice: Subject to any disclaimer, the term of this patent is extended or adjusted under 35 U.S.C. 154(b) by 698 days.

(21) Appl. No.: 10/412,206

(22) Filed: Apr. 14, 2003

(65) Prior Publication Data
US 2007/0100702 A1 May 3, 2007

Related U.S. Application Data

(60) Provisional application No. 60/371,727, filed on Apr. 12, 2002.

(51) Int. Cl.
*G06Q 30/00* (2006.01)
(52) U.S. Cl. ..................... 705/26
(58) Field of Classification Search ............. 705/26, 705/27; 2/1, 7, 456, 47
See application file for complete search history.

(56) References Cited

U.S. PATENT DOCUMENTS

| | | | | |
|---|---|---|---|---|
| 5,410,759 A * | 5/1995 | Hari | | 2/108 |
| 5,680,314 A * | 10/1997 | Patterson et al. | | 700/132 |
| 5,691,923 A * | 11/1997 | Adler et al. | | 702/164 |
| 5,880,974 A | 3/1999 | Tarumi et al. | | 364/578 |
| 5,930,769 A | 7/1999 | Rose | | 705/27 |
| 5,956,525 A | 9/1999 | Minsky | | 396/3 |
| 6,813,838 B2 * | 11/2004 | McCormick | | 33/17 R |
| 2002/0004763 A1* | 1/2002 | Lam | | 705/26 |
| 2002/0178061 A1* | 11/2002 | Lam | | 705/14 |
| 2003/0093330 A1* | 5/2003 | Pabst et al. | | 705/26 |
| 2004/0039592 A1* | 2/2004 | Shima | | 705/26 |
| 2004/0093105 A1* | 5/2004 | Holloway et al. | | 700/97 |
| 2005/0022708 A1* | 2/2005 | Lee | | 112/186 |
| 2005/0131571 A1* | 6/2005 | Costin | | 700/132 |

OTHER PUBLICATIONS

Gurel et al., "Fit and Sizing evaluation of limited-use protective coveralls", Virginia Polytechnic Institute and State University, Dissertation, DAI-B 52/04, p. 1984, Oct. 1991, http://proquest.umi.com/pqdweb?did=746928451&sid=3&Fmt=2&clientId=19649&RQT=309&VName=PQD.*

* cited by examiner

*Primary Examiner*—Jeffrey A. Smith
*Assistant Examiner*—Mila Airapetian

(57) ABSTRACT

A user who desires, for example, to order a dress shirt, is instructed to select a preferred fitting dress shirt, to lay the shirt flat and to take a set of measurements from the flat laying shirt according to key measurements, The set of measurements taken is then input and associated with the type of garment. In this way a shirt may be ordered having measurements which accord with the input set of measurements or which diverge from the set in a way which may be shown to the user in advance of ordering.

8 Claims, 10 Drawing Sheets

SHIRT

SKIRT

PANT

METHOD FOR FACILITATING ORDERING OF GARMENTS

CROSS-REFERENCE TO RELATED APPLICATION

This application claims priority from U.S. provisional patent application No. 60/371,727 filed Apr. 12, 2002.

BACKGROUND OF THE INVENTION

In response to consumer demand, it has long been possible to order garments (i.e., articles of clothing) by mail or telephone. More recently, with the advent of e-commerce and e-tailing, on-line ordering has been possible. A major drawback with remotely ordering garments is a lack of assurance that the requested garments will fit properly. Indeed, modern e-tailing methods have a return rate of up to 40%. Further, some consumers order several different sizes of the same type of garment hoping that one article in the order will fib. The others would then be returned. These problems have seriously impacted the profitability of e-tailing, resulting in some firms pulling out of e-tailing altogether and others scaling back operations or experiencing lower levels of profitability than they might otherwise realise.

A number of attempts have been made at addressing the problem of ordering improperly sized garments. For example, U.S. Pat. No. 5,956,525 to Minsky describes an arrangement wherein a consumer may have body measurements captured in a booth. A drawback with such an arrangement is the expense in providing the booths. Further, the approach requires a paradigm to convert body measurements to the sizing of clothes. This paradigm may result in the manufacture of garments which the consumer considers to be ill-fitting.

Accordingly, a need remains for a method and system which allows for the consumers to have a more accurate estimate and understanding of tie fit of garments in order to facilitate ordering of such garments.

SUMMARY OF THE INVENTION

In the subject invention, a user who desires to order, for example, a dress shirt, is instructed to select a preferred fitting dress shirt, lay the shirt flat, and tale a set of key measurements from the flat lying shirt. The set of measurements is then input and associated with the type of garment. In this way a shirt may be ordered having key measurements which accord with the set of input measurements, or which diverge from the input set in a way which may be shown to the user in advance of ordering.

This approach enhances the likelihood a user will be satisfied with any garment so ordered. The approach may be used in an on-line ordering system so as to increase convenience and reduce delays. For a retailer, the approach should result in lower returns and, therefore, lower overall costs. In view of the enhanced likelihood of satisfied customers, the approach is also likely to generate more repeat business and higher sales.

According to the present invention, there is provided a method for facilitating ordering of garments, comprising:

a) receiving an indication of a desired type of garment;
b) providing a set of key measurements for garments of said desired type relative to a garment of said desired type laid flat and requesting input of corresponding measurements from a garment of said type laid flat;
c) responsive to input of a set of measurements according to said set of key measurements, associating said input set with said type of garment.

The present invention also contemplates a system and computer readable medium for effecting this method.

According to another aspect of the present invention, there is provided a method for facilitating ordering an garment of a type, comprising: selecting a garment of said type having a preferred fit; laying said selected garment flat; receiving a set of key measurements for garments of said type; talking a set of measurements from said selected garment based on said set of key measurements; and reporting said set of taken measurements for said type.

BRIEF DESCRIPTION OF THE DRAWINGS

In the figures which illustrate example embodiments of the invention.

DETAILED DESCRIPTION

Figure 1:
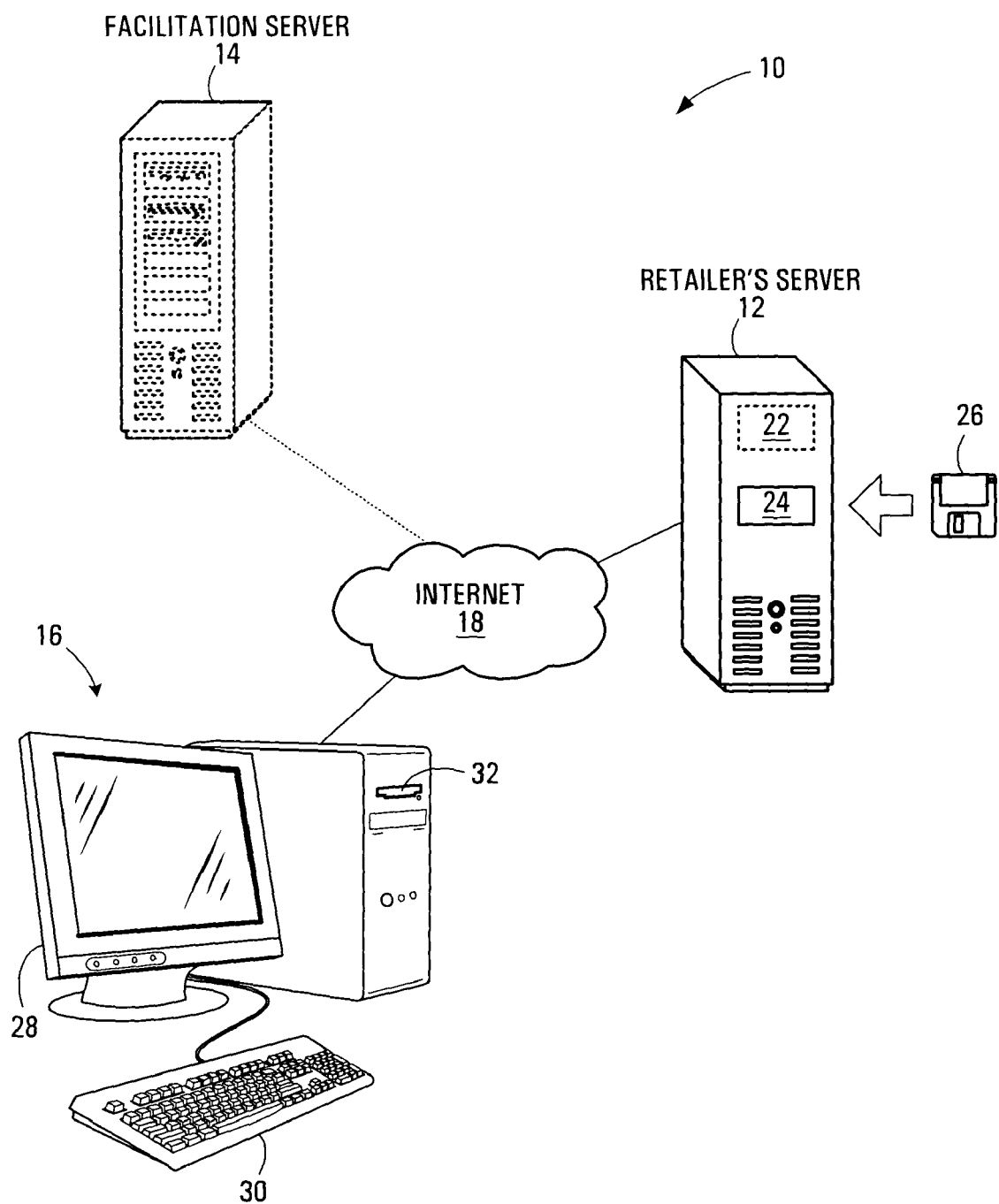
FIG. 1 is a schematic of a system suitable for use with the invention.
Figure 2A:
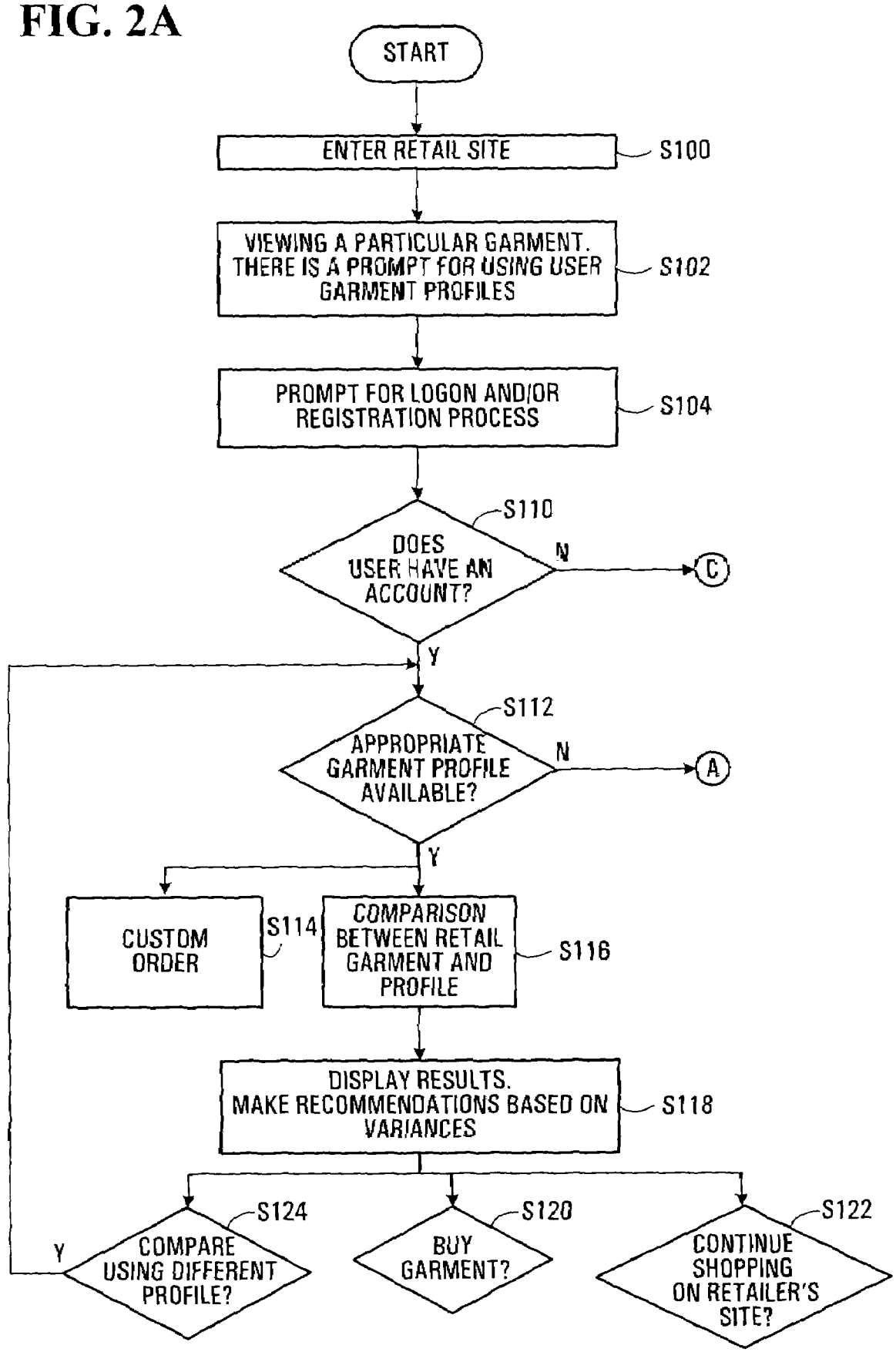
FIGS. 2a, 2b, and 2c comprise a flow diagram for a portion of the system of FIG. 1, and FIGS. 3, 4, 5a, 5b, 6, 7a, 7b, and 8 are representations of possible displays resulting from the practice of the invention.
Figure 2B:
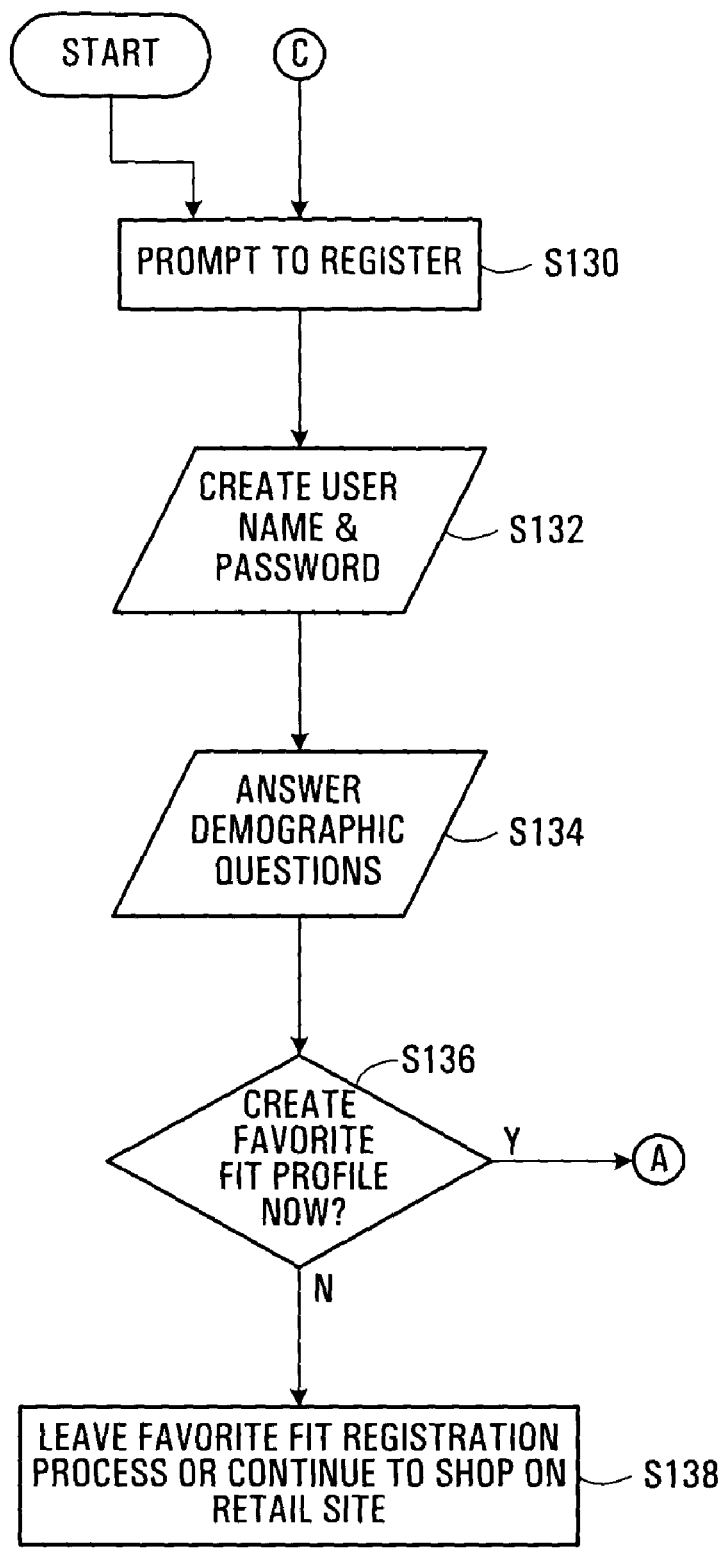
Figure 2C:
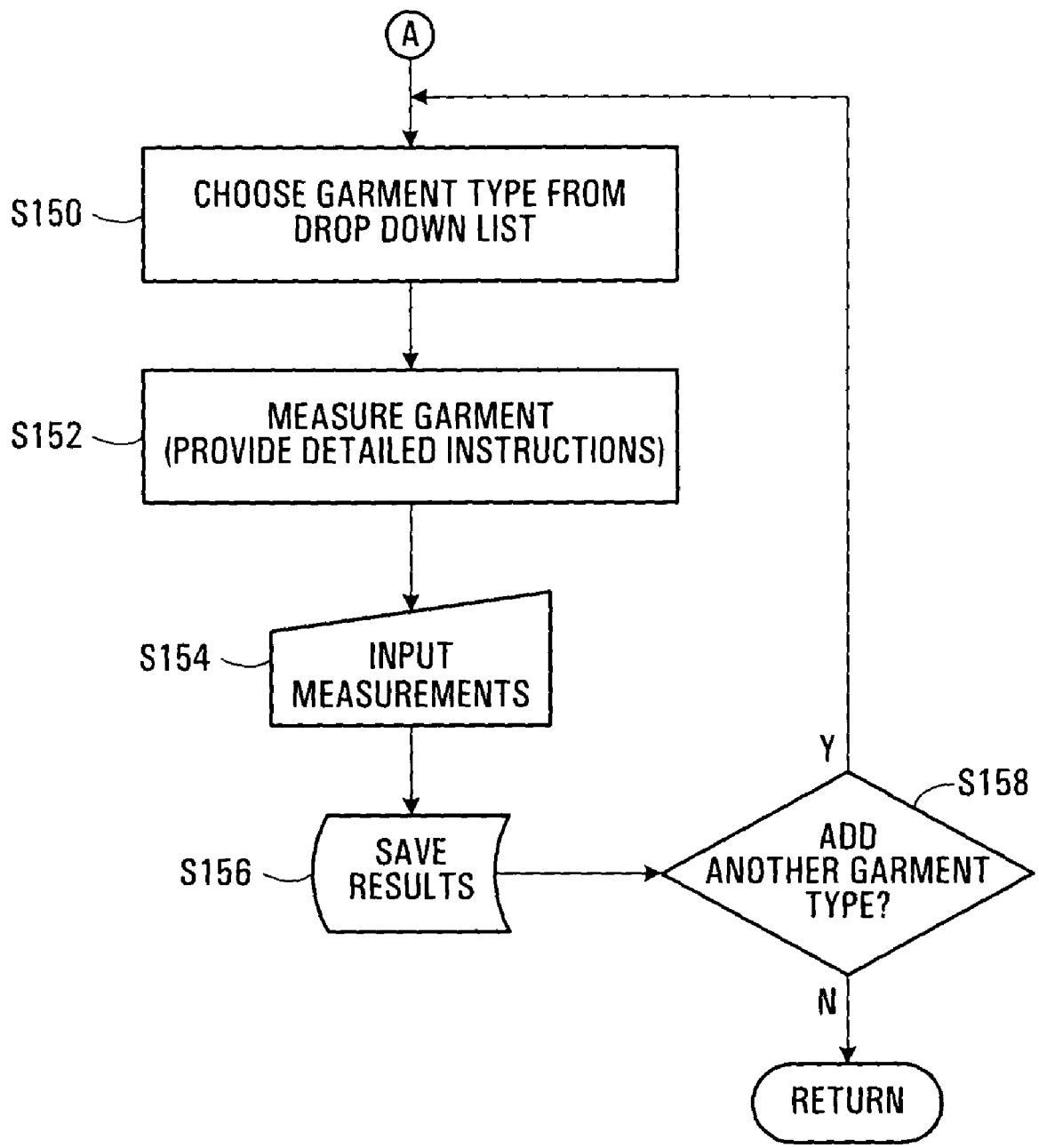

Turning to FIG. 1, a system 10 comprises a retailer's server 12, an optional facilitation server 14, and a user terminal 16 interconnected by a public internet 18. The retailer's server has a memory 22 and a reader 24 for reading a computer readable media, such as diskette 26. The terminal 16 comprises a display 28 and user input devices, such as a keyboard 30, as well as a reader 32 for reading computer readable media. Diskette 26 adapts retailer's server 12 to perform the procedure illustrated in FIGS. 2a, 2b, and 2c.

In operation, a user at terminal 16 may log on to the internet 18 and point a web browser to retailer's server 12. Referencing FIGS. 2a through 2c along with FIG. 1, when this occurs, the retailer's server may interact with the user, allowing the user to view details of various types of garments carried by the retailer (S100). At a certain point, the server may receive an indication from the user of an interest in ordering a certain retail garment (S102). The retail garment may, for example, be a dress shirt, a pullover top, a skirt, or pants. For the purposes of discussion, it is assumed the user indicates an interest in ordering a pullover sweater. A pullover sweater is a type of pullover top, which includes long and short sleeved pullovers, sleeveless pullovers, sweaters, T-shirts, and tunics. When this occurs, the server requests the input of a user identifier (S104). The user at terminal 16 using keyboard 31) or another appropriate input device may supply the identifier which may be in the nature of the user's name and/or a customer number. The server 12 then addresses a database in its memory 22 with the information supplied to determine if the user is a new user (S110). Assuming the user is a new user, the user is prompted to register (S130), a name and password is communicated to the user (S132), and certain demographic information may be collected (S134). The user is then given the opportunity to create a profile for a preferred fitting garment of the desired type (S136, S138, S150). More particularly, the server requests that the user at terminal 16 select a garment of the desired type which has a preferred fit This may be accomplished by the server sending data to the terminal 16 which results in a suitable audio and/or visual presentation at the terminal. Thus, if the desired type is a pullover top, the user is expected to retrieve a pullover top from his or her belongings which has, as far as the user is concerned, a preferred fit. The server also requests that the garment with the preferred fit be laid flat and that a set of measurements be taken from the garment according to a set of key measurements (S152, S154).

Figure 3:
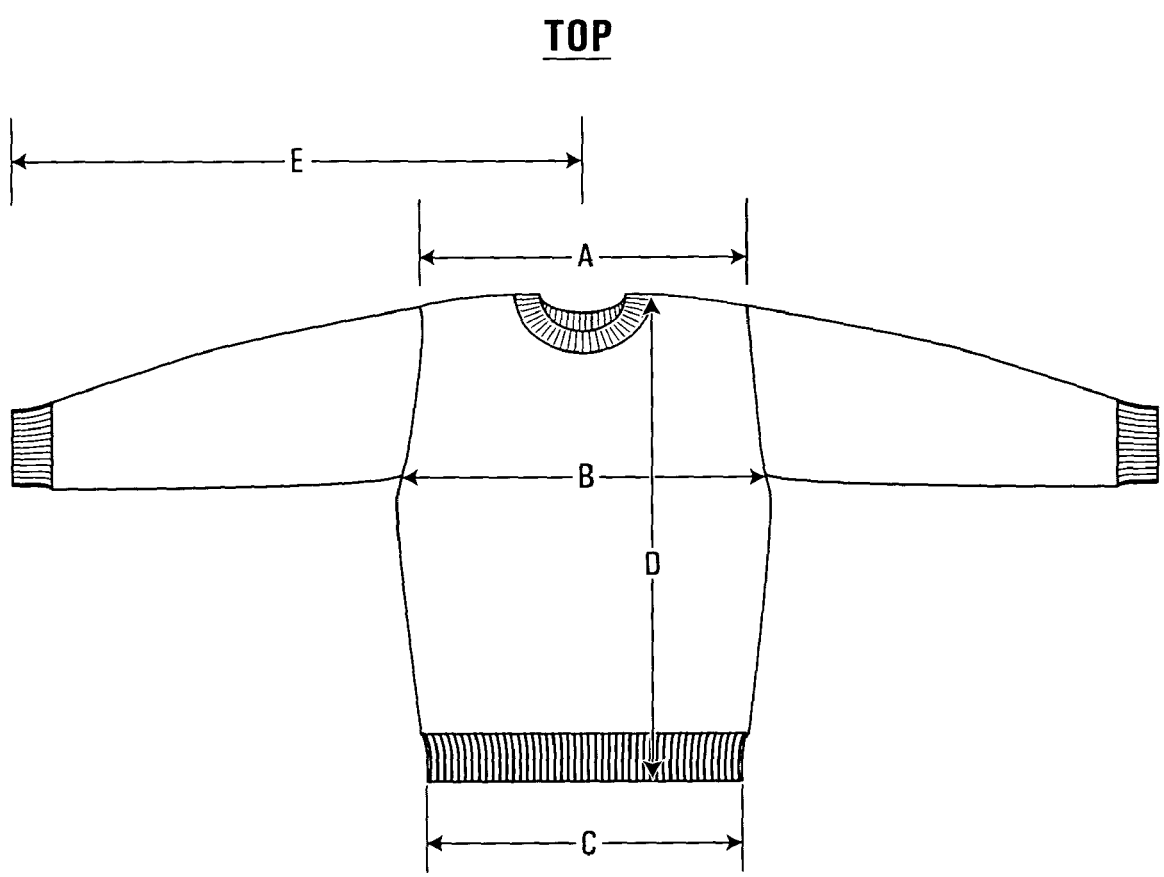

The server 12 then retrieves from memory 22 a particular set of key measurements which corresponds with the desired type of garment which had been selected by the user. The server may then send data to terminal 16 so that the terminal imparts to the user the key measurements for the desired garment (S152). By way of example, this may be accomplished by displaying at display 28 a representation of the desired type of garment lying flat with dimension lines illustrating each of the key measurements for the garment. A representation, as it may appear on display 28 for a pullover top, is illustrated in FIG. 3.

The key measurements illustrated for the top 40 are as follows:
  Shoulder measurement, a, measured across the top of the back of the garment, from one armhole seam straight across to the other armhole seam.
  Chest at armhole measurement, b, measured across the torso, from the bottom of one armhole seam straight across to the bottom of the other armhole seam.
  Bottom width measurement, c, measured straight across the bottom of the garment, from one side seam to the other side seam. If no side seams are present, this measurement should be taken from one side edge to the other side edge.
  Length at shoulder point, d, measured from the shoulder point (where the shoulder seam meets the neck at the top of the garment) straight down to the garment's bottom edge.
  Sleeve length from centre back, e, measured from the centre back of the neck opening, straight along shoulder and sleeve to the end edge of the cuff.

Figure 4:
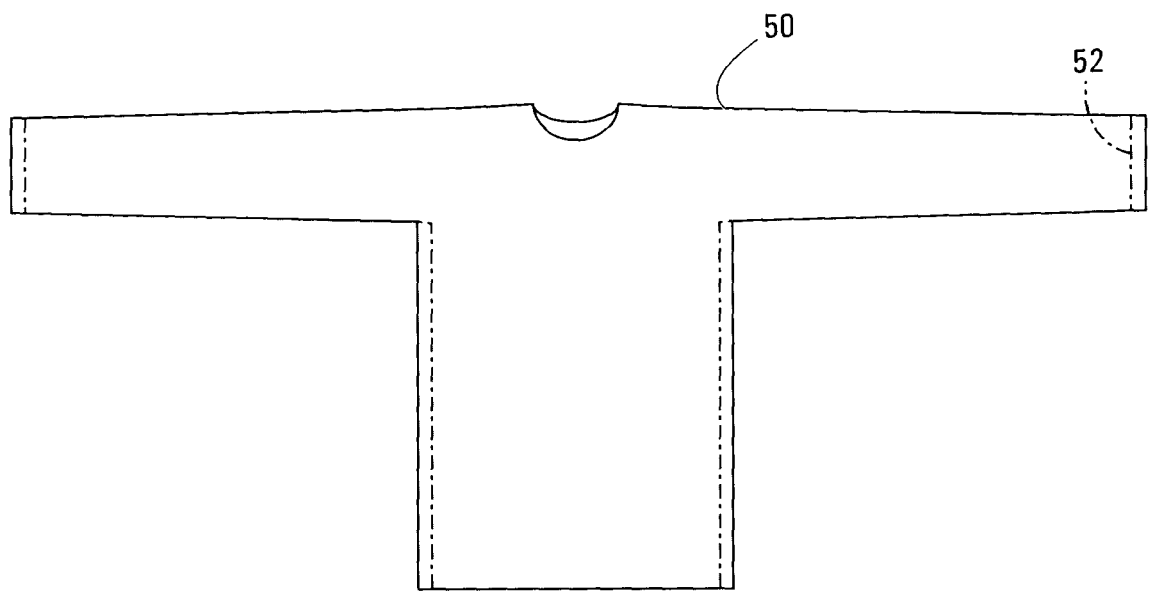

The user is instructed to take all measurements from relaxed, unstretched garments laid out in full, on a surface large enough to do so unhindered (e.g. floor, large cleared table) and completely flattened without folds or large wrinkles. Thus, knits or garments with elasticized components should be relaxed, not stretched. Garments with pleats should have the pleats closed and flattened, not open. Garments with pleats fit differently than those without pleats; consequently, a pleated garment should not be used as a reference when selecting an un-pleated style, and vice versa. Where seams are present at the flattened edge of a garment, they may form the measurable edge of the flattened garment. Only when a garment has been flattened properly can it be considered prepared for measurement.

Where the desired type of garment is a pullover top, this will mean that the user should, after properly laying flat a pullover top having a preferred fit, take the measurements along lines a through e (FIG. 3) and input these. Any received set of measurements becomes the user profile for this type of garment and is associated by the server with the user identifier and the desired type and stored in database 22 (S156). Where the system has the appropriate profile (S112), the user may then elect to custom order a garment of the desired type (S114) with the server requesting the input of colour and any other options for the desired garment. If the garment is not a custom order, the server may compare the retail garment (e.g., sweater) of interest to the user profile for garments of that type (e.g., pullover tops) (S116). The server may then send display data allowing display 28 of terminal 16 to display a representation of a garment of the desired type scaled to an existing set of manufacturer's dimensions which dimensions most closely match the input set of measurements. Additionally, the server sends further data allowing for a transparent display of a representation of a garment of the desired type scaled to the user's profile for garments of that type (i.e., the input set of measurements for garments of that type) (S118). The result is shown in FIG. 4 for a pullover top scaled to a set of manufacturer's dimensions illustrated in solid line at 50 with a transparent overlay in ghost outline illustrated at 52 for a pullover top scaled to an input set of measurements. Of course, the scaling in both cases need be equivalent for the overlay to be meaningful. With this overlay, a user may quickly discern differences between a garment having the set of measurements applicable to a preferred fitting pullover top and the pullover sweater of closest size produced by the manufacturer. The similarities and/or differences in measurements may also be presented in a table of actual measurements, detailing the measurement differences in numeric and percentages. In addition, a text narrative may be provided to outline in conversational terms the similarities and/or differences. The user is then given an opportunity to accept or decline the pullover sweater produced by the manufacturer. If the user accepts, again colour and other options may be entered and the order is processed (S120). If the user does not accept, the order is aborted and the user may continue shopping (S122) or repeat the comparison using a different garment profile (S124). Regarding this last option, a user may elect to have more than one profile for a given type of garment. For example, a user could have two pullover top profiles: one derived from a preferred fitting T-shirt and another derived from a preferred fitting sweater.

If it turns out the user is not a new user (S110) then the server will determine whether there is an existing profile for the desired type of garment associated with the user identifier for that user (S112). If yes, the process continues as aforedescribed. If no, the user is first prompted to enter this profile as aforedescribed (S150, S152, S154, S156).

An existing user could access the site for creating garment profiles directly rather than while shopping on-line. Such a user could then create or change one or more garment profiles (S150, S158).

Figure 5A:
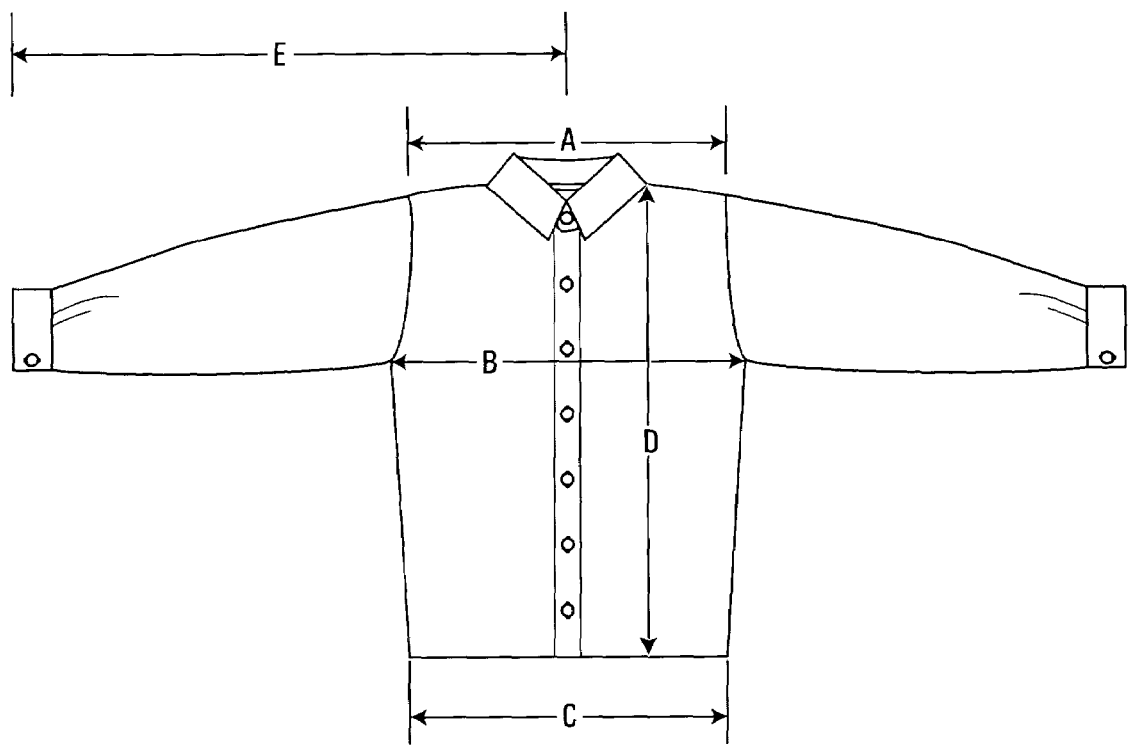
Figure 5B:
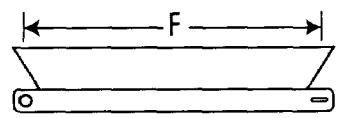

The set of key measurements varies depending upon the type of garment. For long-sleeved shirts, short-sleeved shirts, sleeveless shirts, collarless shirts, and unstructured jackets, the key measurements are those shown for the dress shirt of FIGS. 5a and 5b, as follows:
  Shoulder measurement, a, measured across the top of the back of the garment, from one armhole seam straight across to the other armhole seam.
  Chest at armhole measurement, b, measured across the torso, from the bottom of one armhole seam straight across to the bottom of the other armhole seam.
  Bottom width measurement, c, measured straight across the bottom of the garment, from one side seam to the other side seam. If no side Seams are present, measure from one side edge to the other side edge.
  Length at shoulder point, d, measured from the shoulder point (where the shoulder seam meets the neck at the top of the garment) straight down to the garment's bottom edge.
  Sleeve length from centre back, e, measured from the centre back of the neck opening, straight along shoulder and sleeve to the end edge of the cuff.
  Neck, f, measured along the opened, flat collar, from centre of button to outside edge of buttonhole.

Figure 6:
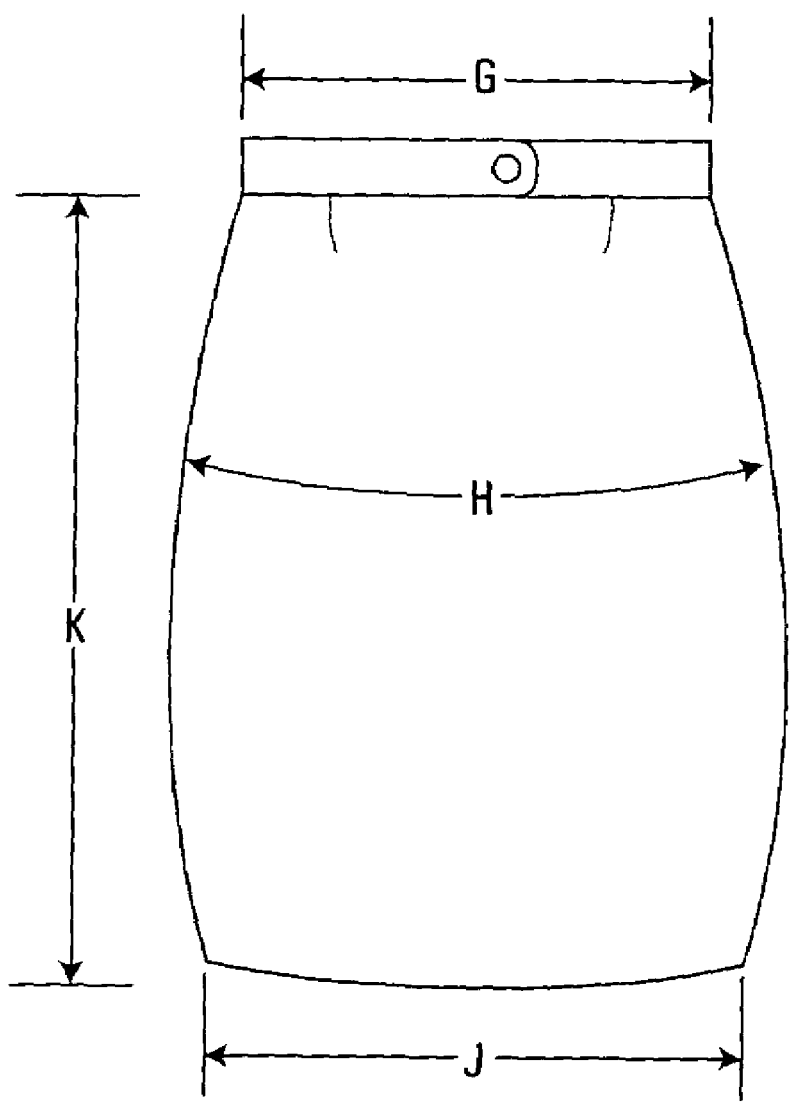

The key measurements for skirts of all types and styles are illustrated in FIG. 6, as follows:

Waist, g, measured flat from one folded edge to the other folded edge. If the garment has a contoured or curved waist, allow the measuring tape to follow the curve, not straight across, whether or not the edge is an actual waistband.

Hip, h, measured flat, straight across approximately 9" (23 cm) below the waist seam from one folded edge to the other folded edge.

Bottom width, j, measured flat across the bottom of the skirt, from one folded edge to the other folded edge.

Length, k, measured from the waist seam (not the top of the waistband) to the bottom-finished hem edge.

Figure 7A:
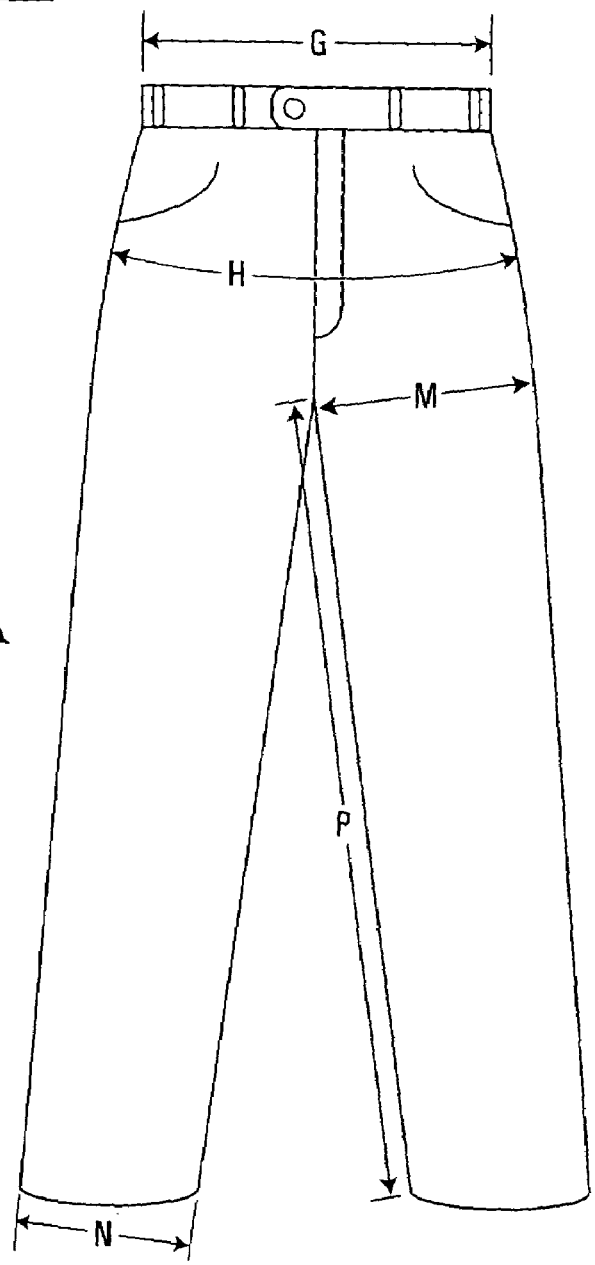

The key measurements for a pair of pants of any type or style are illustrated in FIGS. 7a and 71b, as follows:

Waist, g, measured flat from one folded edge to the other folded edge. If the garment has a contoured or curved waist, allow the measuring tape to follow the curve, not straight across, whether or not the edge is an actual waistband.

Hip, h, measured flat, straight across approximately 9" (23 cm) below the waist seam from one folded edge to the other folded edge.

Thigh, m, measured on one leg flat from inseam to outer seam at the crotch seam level.

Leg bottom width, n, measured flat across at the bottom of the finished edge of a leg.

Figure 7B:
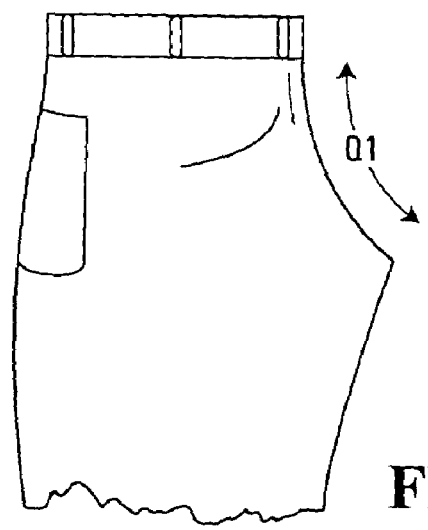

Inseam, p, measured inseam from crotch seam to desired bottom finished edge Rise. This is comprised of two measurements: a measurement, q1, from the Crotch seam up the front of the pant to the bottom edge of the waistband summed with a measurement (not shown) from the crotch seam up the back of the pant to the bottom edge of the waistband. To take measurement q1, the pants should be folded in half rearwardly about the crotch seam, as illustrated in FIG. 7b. The pants should be folded in half forwardly about the crotch seem to permit the other rise measurement.

Figure 8:
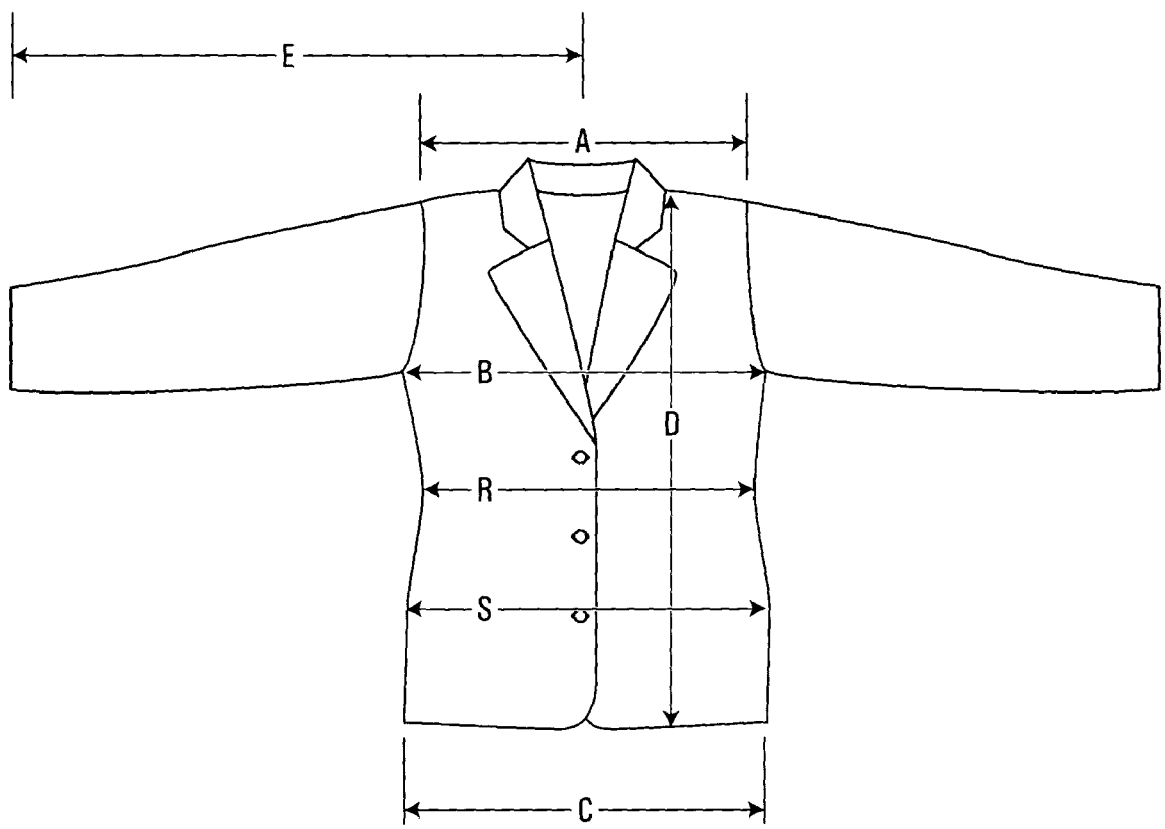

The key measurements for structured blazers and jackets of all styles are illustrated in FIG. 8, as follows:

Shoulder measurement, a, measured across the top of the back of the garment, from one armhole seam straight across to the other armhole seam.

Chest at armhole measurement, b, measured across the torso, from the bottom of one armhole seam straight across to the bottom of the other armhole seam.

Bottom width measurement, c, measured straight across the bottom of the garment, from one side seam to the other side seam. If no side Seams are present, measure from one side edge to the other side edge.

Length, at shoulder point, d, measured from the shoulder point (where the shoulder seam meets the neck at the top of the garment) straight down to the garment's bottom edge.

Waist, r, measured by first finding the 'natural' Waistline of the Jacket. With the Jacket laid flat, there may be a naturally visible waistline—almost always about 17" (43 cm) below the top of the centre back. The waist level should be marked at this point. Measurement r is taken straight across the marked waistline from one side seam to the other side seam.

Hip, s, measured straight across from one side seam to the other side seam, at the fullest point of the hip—usually about 9" (23 cm) below the waist level marked previously.

To process an order, the retailer's server 12 may send the order to its order department.

The retailer's server 12 may instead be a manufacturer's server. Optionally, there may not be an option to custom order garments.

Optionally, a separate facilitation server 14 may be provided to obtain and store sets of measurements in association with users and types of garments. In such instance, after a retailer's server 12 receives a desired type of garment from a user, the retailer's server may be adapted to point the user's web browser to facilitation server 14. Facilitation server 14 then undertakes the procedure of S112 and S150 to S158. The facilitation server then returns to the retailer's server 12 the set of measurements associated with a desired type of garment and a user identifier. Facilitation server 14 also then points the user's web browser back to the retailer's server 12 with the user's identifier. The retailer's server 12 then picks up the procedure at S114 and S116.

As another option, computer readable media may be provided for terminal 16 to allow it to undertake the procedure from S150 to S158 locally. In this instance, when the terminal 16 logs on the retailer's server 12 and chooses a retail garment of interest, the terminal provides the user identifier and associated garment profile for the type of garment represented by the retail garment, whereupon operation of retailer's server 12 commences at S114, S116.

Although the example embodiments have been described as operating over a public internet, optionally, other networks may be employed. For example, the network may be the public switched telephone network (PSTN) and terminal 16 may simply dial up a connection to server 12.

Other modifications will be apparent to those skilled in the art and, therefore, the invention is defined in the claims.

What is claimed is:

1. A method for facilitating ordering of garments, comprising:
   a) receiving an indication of a desired type of garment;
   b) providing a definition for each key measurement of a plurality of key measurements for garments of said desired type when laid flat and requesting input of input measurements according to said each key measurement definition from a preferred fitting garment of said type laid flat;
   c) responsive to input of said input measurements, displaying a scaled representation of a garment of said type having said input measurements and associating said input measurements with said type of garment;
   d) displaying a scaled representation of a garment of said type having pre-defined manufacturer's measurements contemporaneously with said display of a scaled representation of a garment of said type having said input measurements, wherein each said displaying is such that one of said display of said scaled representation of a garment of said type having said input measurements and said display of said scaled representation of a garment of said type having pre-defined manufacturer's measurements is displayed transparently over another of said display of said scaled representation of a garment of said type having said input measurements and said display of said scaled representation of a garment of said type having predefined manufacturer's measurements.

2. The method of claim 1 wherein said type is a pullover top and wherein said plurality of key measurements comprise:
   a shoulder measurement measured across the top of the back of the garment, from one armhole seam straight across to the other armhole seam;
   a chest at armhole measurement measured across the torso, from the bottom of one armhole seam straight across to the bottom of the other armhole seam;

a bottom width measurement measured straight across the bottom of the garment, from one side seam to the other side seam, where side seams are present, and otherwise from one side edge to the other side edge;

a length at shoulder point measured from the shoulder point where the shoulder seam meets the neck at the top of the garment straight down to the garment's bottom edge; and a sleeve length from centre back measured from the centre back of the neck opening, straight along shoulder and sleeve to the end edge of the cuff.

3. The method of claim 1 wherein said type is a dress shirt and wherein said plurality of key measurements comprise:

a shoulder measurement measured across the top of the back of the garment, from one armhole seam straight across to the other armhole seam;

a chest at armhole measurement measured across the torso, from the bottom of one armhole seam straight across to the bottom of the other armhole seam;

a bottom width measurement measured straight across the bottom of the garment, from one side seam to the other side seam, where side seams are present, and otherwise from one side edge to the other side edge;

a length at shoulder point measured from the shoulder point where the shoulder seam meets the neck at the top of the garment straight down to the garment's bottom edge;

a sleeve length from centre back measured from the centre back of the neck opening, straight along shoulder and sleeve to the end edge of the cuff; and a neck: measured along the opened, flat collar, from centre of button to outside edge of buttonhole.

4. The method of claim 1 wherein said type is a skirt and wherein said plurality of key measurements comprise:

a waist measurement measured flat from one folded edge to the other folded edge allowing the measuring tape to follow the edge of the waist;

a hip measurement measured flat, straight across approximately 9" (23 cm) below the waist seam from one folded edge to the other folded edge;

a bottom width measurement measured flat across the bottom of the skirt, from one folded edge to the other folded edge;

a length measured from the waist seam to the bottom-finished hem edge.

5. The method of claim 1 wherein said type is pants and wherein said plurality of key measurements comprise:

a waist measurement measured flat from one folded edge to the other folded edge allowing the measuring tape to follow the edge of the waist;

a hip measurement measured flat, straight across approximately 9" (23 cm) below the waist seam from one folded edge to the other folded edge;

a thigh measurement measured on one leg flat from inseam to outer seam at the crotch seam level;

a leg bottom width measurement measured flat across at the bottom of the finished edge of a leg;

an inseam measurement measured inseam from crotch seam to desired bottom finished edge; and a rise measurement comprising a measurement from the crotch seam up the front of the pant to the bottom edge of the waistband summed with a measurement from the crotch seam up the back of the pant to the bottom edge of the waistband.

6. The method of claim 1 wherein said type is a structured blazer or jacket and wherein said plurality of key measurements comprise:

a shoulder measurement measured across the top of the back of the garment, from one armhole seam straight across to the other armhole seam;

a chest at armhole measurement measured across the torso, from the bottom of one armhole seam straight across to the bottom of the other armhole seam;

a bottom width measurement measured straight across the bottom of the garment, from one side seam to the other side seam, where side seams are present, otherwise from one side edge to the other side edge;

a length at shoulder point measured from the shoulder point where the shoulder seam meets the neck at the top of the garment straight down to the garment's bottom edge;

a waist measurement measured by first finding the visible waistline or about 17" (43 cm) below the top of the centre back and measuring straight across this waistline from one side seam to the other side seam; and a hip measurement measured straight across from one side seam to the other side seam, at the fullest point of the hip or about 9" (23 cm) below said waistline.

7. A method for facilitating ordering of garments, comprising:

a) receiving an input set of key measurements for garments of said desired type relative to a garment of said desired type laid flat;

c) responsive to input of said input set, displaying a scaled representation of a garment of said type having said set of measurements; and d) displaying a scaled representation of a garment of said type having pre-defined manufacturer's measurements contemporaneously with said display of a scaled representation of a garment of said type having said set of input measurements, wherein said each said displaying is such that one of a display of said scaled representation of a garment of said type having said set of input measurements and a display of said scaled representation of a garment of said type having pre-defined manufacturer's measurements is displayed transparently over another of said display of said scaled representation of a garment of said type having said set of input measurements and said display of said scaled representation of a garment of said type having pre-defined manufacturer's measurements.

8. A method for facilitating ordering of garments, comprising:

a) receiving an indication of a desired type of garment;

b) providing a definition for each key measurement of a plurality of key measurements for garments of said desired type when laid flat and requesting input of input measurements according to said each key measurement definition from a preferred fitting garment of said type laid flat, said providing a definition of each key measurement comprising displaying a representation of a laid flat garment of said desired type with an illustration of each key measurement;

c) responsive to input of said input measurements, displaying a scaled representation of a garment of said type having said input measurements and associating said input measurements with said type of garment; and d) displaying a scaled representation of a garment of said type having pre-defined manufacturer's measurements contemporaneously with said display of a scaled representation of a garment of said type having said input measurements such that one of said display of said scaled representation of a garment of said type having said input measurements and said display of said scaled representation of a garment of said type having predefined manufacturer's measurements is displayed transparently over another of said display of said scaled representation of a garment of said type having said input measurements and said display of said scaled representation of a garment of said type having pre-defined manufacturer's measurements.

* * * * *